(12) United States Patent
Ma

(10) Patent No.: US 6,749,237 B1
(45) Date of Patent: Jun. 15, 2004

(54) UNITARY BODY SWIVELING HOIST RING AND METHOD OF MANUFACTURE

(76) Inventor: Shu Lan Ma, 17181 Gale Ave., Unit C, City of Industry, CA (US) 91745

( * ) Notice: Subject to any disclaimer, the term of this patent is extended or adjusted under 35 U.S.C. 154(b) by 0 days.

(21) Appl. No.: 10/107,374

(22) Filed: Mar. 26, 2002

Related U.S. Application Data

(60) Provisional application No. 60/297,056, filed on Jun. 8, 2001.

(51) Int. Cl.$^7$ ................................................ B66C 1/00
(52) U.S. Cl. ...................... 294/1.1; 294/82.1; 403/78
(58) Field of Search ................ 294/1.1, 82.1, 294/89; 403/78, 164, 165

(56) References Cited

U.S. PATENT DOCUMENTS

| | | | |
|---|---|---|---|
| 3,404,503 A | * 10/1968 | Courtois et al. | ............... 294/89 |
| 3,456,547 A | * 7/1969 | Strong | .......................... 294/89 |
| 3,492,033 A | 1/1970 | Mueller | |
| 3,628,820 A | 12/1971 | Blatt | |
| 3,796,464 A | * 3/1974 | Hansen et al. | ............... 403/165 |
| 3,905,633 A | 9/1975 | Larson | |
| 4,074,519 A | 2/1978 | Garrett | |
| 4,179,151 A | * 12/1979 | Tye | ............................. 294/89 |
| 4,290,638 A | * 9/1981 | Manning | ..................... 294/89 |
| 4,570,987 A | 2/1986 | Wong et al. | |
| 4,641,986 A | 2/1987 | Tsui et al. | |
| 5,248,176 A | 9/1993 | Fredriksson | |
| 5,405,210 A | 4/1995 | Tsui | |
| 5,634,734 A | 6/1997 | Schron, Jr. et al. | |
| 5,732,991 A | * 3/1998 | Tsui | ............................. 294/89 |
| D417,328 S | * 11/1999 | Kwon | ......................... D34/35 |
| 5,979,954 A | 11/1999 | Tsui et al. | |
| 6,022,164 A | 2/2000 | Tsui et al. | |
| 6,068,310 A | 5/2000 | Fuller et al. | |

* cited by examiner

*Primary Examiner*—Eileen D. Lillis
*Assistant Examiner*—Michael Lowe
(74) *Attorney, Agent, or Firm*—Donn K. Harms

(57) ABSTRACT

An improved hoist ring and method of manufacturing a hoist ring having a generally U shaped ring member and two substantially parallel legs. A pair of apertures communicated through the parallel legs and rotationally engage a pair of elongated shoulders protruding from a body member. A taper in the upper wall surface of the apertures allows the ring member to be inserted over the shoulders and then bent to a U shape to form the device and also allows for the assembly of the device from two unitary structures.

12 Claims, 2 Drawing Sheets

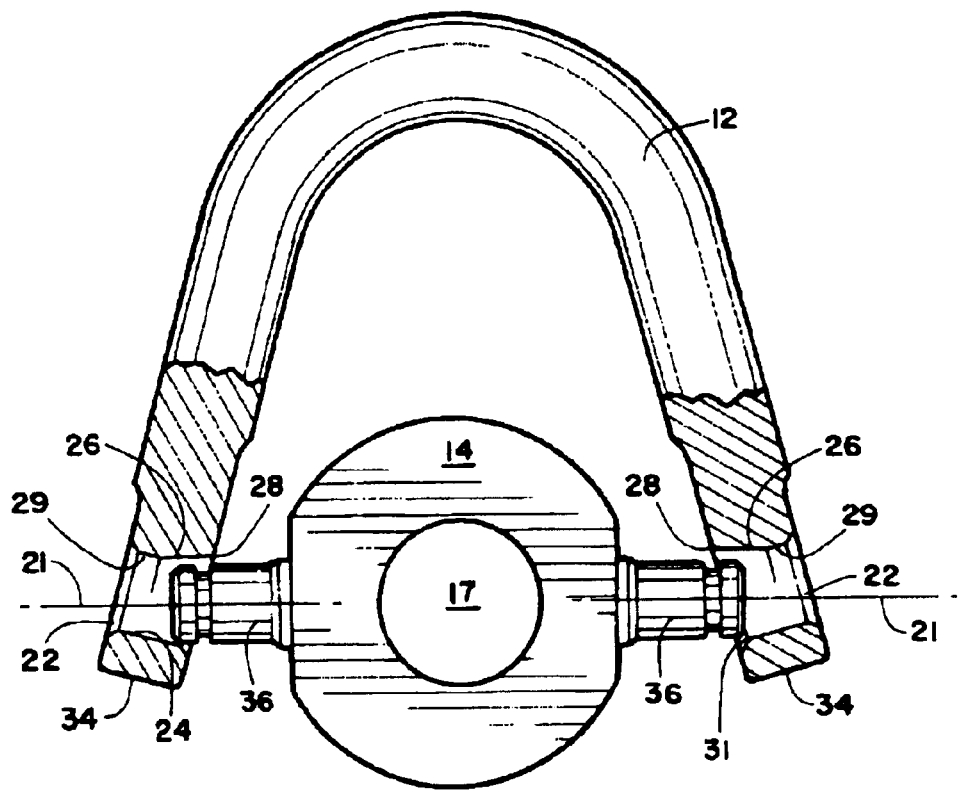
FIGURE 4
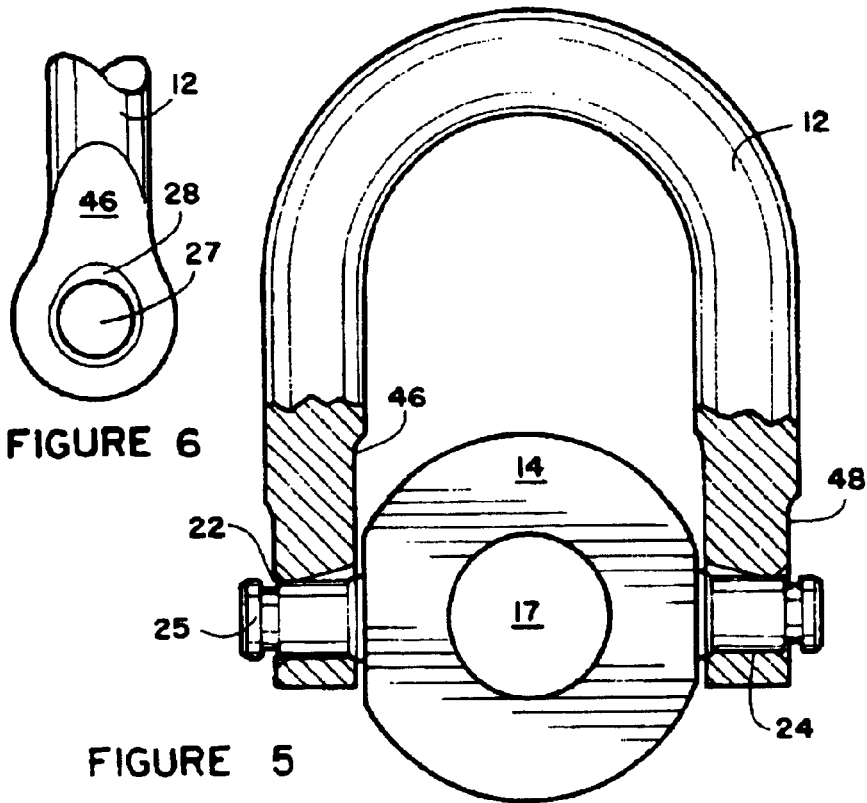
FIGURE 6
FIGURE 5

UNITARY BODY SWIVELING HOIST RING AND METHOD OF MANUFACTURE

This application claims the benefit of U.S. Provisional Application No. 60/297,056 filed Jun. 08, 2001.

FIELD OF THE INVENTION

The disclosed device relates to a hoist ring. More particularly it relates to a swiveling hoist ring that is typically used to lift very heavy equipment by cooperative attachment of the hoist ring to the equipment being lifted. Such hoist rings conventionally have a body portion that is placed in threaded engagement with the equipment being lifted using a bolt through a center aperture in the body portion. The body portion is then cooperatively engaged with two ends of a ring member which engages protruding flanges which are threaded into the sides of the body portion.

To date the lifting capacity of such devices has been limited to the strength of the engagement of the protruding flanges which are in threaded engagement into the body portion since the flanges are separate pieces from the body portion. Or in some cases the lift ring has bent ends that protrude into divots in the body portion which are then capped to hold the ring ends in the divot. This too limits the strength of the lifting device to the strength of ring at the bend and the parts engaging the ring ends with the body portion.

BACKGROUND OF THE INVENTION

In the heavy equipment industry, there is a constant requirement to relocate equipment which weighs tons. Such equipment while being large and heavy, is frequently delicate due to the nature of the operation of the equipment when running. Laths, mills, tape mills, and other such equipment must operate to make products that have extremely small tolerances when in operation. However, the weight and bulk of heavy equipment naturally make it hard to handle.

As such, manufacturers and owners of such bulky and heavy machinery frequently provide lift points where the body of the machine being hoisted may be attached to a cooperating fastener to provide an attachment point for a crane or similar heavy lifting device. Conventionally, such attachments feature apertures extending into the body of the machine to be lifted, which can be engaged by shackles or lifting rings which are fitted with the proper cooperating attachment to thread into the various apertures for lifting.

Known as shackles, hoist rings, lifting eyes, and similar names, the devices generally follow the same use pattern and feature some sort of U-shaped ring attached at both ends to a centrally located body portion which is engaged may be engaged in turn with the machine to be lifted. Frequently the U-shaped ring is engaged with the body portion between the sides of the U-shaped ring in a manner to provide a swivel to the ring.

Such an engagement of the ends of the ring to allow for a swivel generally requires that the ends of the ring itself somehow engage the body portion themselves, or, be attached to the body portion by bolts or other attachments which engage through the U-shaped ring and with the body portion. However, this method of attachment of the ring to the body severely limits the load that the assembled hoist ring device may lift since the strength of the parts holding the body portion together in the attachment to the ring ends is a limiting factor. If the equipment weight exceeds the strength of the screws or bolts or other parts holding the ring ends in engagement with the body portion, a separation occurs and the equipment falls to the ground.

The device herein disclosed solves this connection problem by eliminating the fasteners or cooperative engagement of flanges used on other swivel style hoist rings to attach the U-shaped ring to the body. By eliminating the separate protruding flanges to engage the U-shaped ring, the fasteners and screws and pins that are used to assemble body to the flanges which engage the ring ends are eliminated. This allows for the provision of a direct engagement of the one piece U-shaped ring to a one piece unitary body portion having a protruding flange vastly improving the strength of the assembled hoist ring device.

U.S. Pat. No. 4,074,519 (Garrett) teaches a swivel shackle for lifting machinery. However, Garret requires the use of a two piece Y-shaped adapter which is bolted to the U-shaped ring and increases the number of parts required and the number of parts which can fail due to an indirect attachment of the U shaped ring to the body portion.

U.S. Pat. No. 5,248,176 (Fredriksson) discloses a swivel coupling device for coupling a load to a base member. However the strength of the Fredriksson device is limited by the need to bend the ends of the U-shaped ring and the use of a plurality of parts to form the body section which weakens the entire hoist ring.

U.S. Pat. No. 5,979,954 (Tsui) discloses a safety hoist ring for lifting heavy loads. Tsui however suffers from the inherent problem of other prior art in that the body portion is separate from a pin which must be inserted through the U-shaped ring and the body.

U.S. Pat. No. 5,634,734 (Schron) features a triangular shaped ring that engages with a multiple piece body section. However, the lifting capacity of Schron is limited by the fact that it requires a two piece body which is held together by a plurality of bolts. Other available prior art suffers from the same problems created with multiple piece body sections or ring sections.

Thus, there is a continuing need for improvement in hoist ring devices to overcome the weight lifting restrictions imposed by the need to assembly such devices from multiple parts which inhibit their strengths. Additionally, there is a need to alleviate the waste of time caused by assembly, lost parts, and potential failure due to overloading of such hoist ring devices.

Accordingly, it is the object of this invention claimed herein to provide a simplified hoist ring device that is provided as a unit and that requires no assembly by the user.

It is another object of this invention to provide a hoist ring that provides increased lifting capacity from the increased strength provided the unitary body engaged having protruding flanges that engage with a unitary structure ring member.

It is still another object of this invention provide a method of manufacture of a hoist ring that has a unitary body portion with protruding flanges which engage a unitary ring structure when fully assembled.

It is an additional object of this invention to provide a hoist ring that is easily attached to conventional hoist ring connection points on heavy machinery thus allowing it to be used in an installed base of such devices without having to alter them or the machinery being lifted.

Further objectives of this invention will be brought out in the following part of the specification, wherein detailed description is for the purpose of fully disclosing the current preferred embodiments of the invention without placing limitations thereon. This device and method of manufacture accordingly comprise the features of the construction, combination of elements, and arrangement of parts that will be exemplified in the construction hereinafter set forth in the specification, and the scope of the preferred embodiments of the invention will be indicated in the claims.

BRIEF DESCRIPTION OF THE DRAWING FIGURES

The accompanying drawings which are incorporated in and form a part of this specification illustrate embodiments of the disclosed processing system and together with the description, serve to explain the principles of the invention.

FIG. 4 depicts the method of forming the device by insertion of the shoulder portions of the body through the specially formed apertures of the ring member during assembly of the device.

FIG. 5 is a side cut away view depicting the device with the ring member compressed onto the shoulders formed on the sides of the unitary body portion and showing the special construction of the tapered upper portion of the apertures formed in the ring member and the race formed at the termination of the taper.

FIG. 6 is a side view of the inside edge of the ring member where a taper on the upper edge of the aperture allows for insertion of the shoulders of the body for assembly.

DETAILED DESCRIPTION OF PREFERRED EMBODIMENTS OF THE DISCLOSED DEVICE

Figure 1:
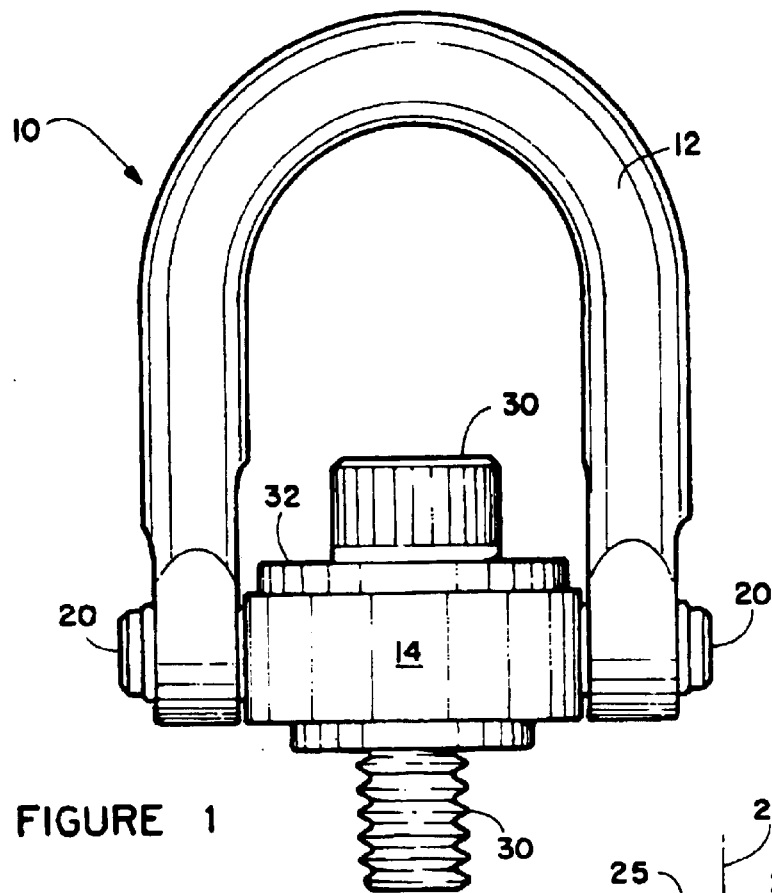
FIG. 1 depicts the unitary structured body portion assembled with the shoulder portions engaging the unitary constructed ring member.

FIG. 1 depicts the disclosed device 10 in its final assembled form ready for conventional attachment to machinery to be lifted. The ring member 12 is unitary in structure formed of single metal piece and bent substantially to a "u" shape. The ring member 12 is combined in operative engagement with the unitary structured, body 14 which has shoulders 20 formed about and projecting from the perimeter or sidewall of the body 14. When affixed to heavy machinery, conventionally a screw 30 used in combination herewith, communicates through a body aperture 17 in the body 14 along with a washer 32 and is cooperatively engaged with the machinery to be lifted at a lift point thereon.

Figure 2:
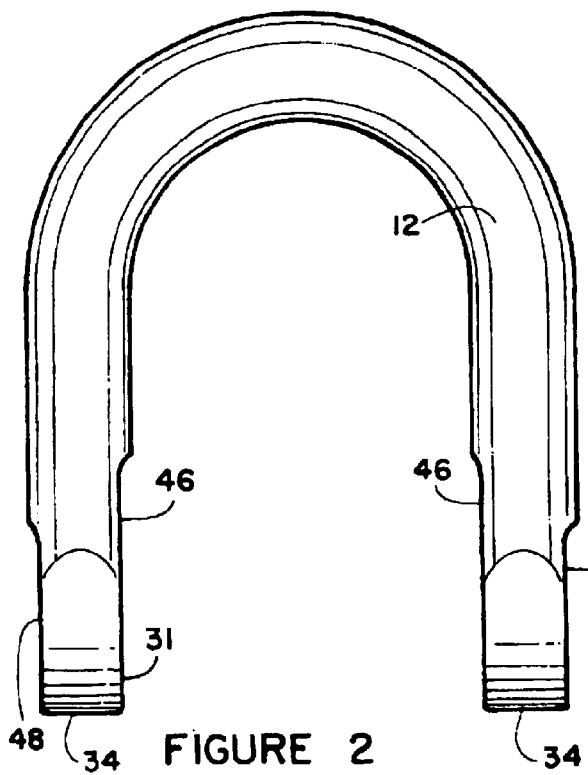
FIG. 2 is a side view of the ring member.
Figure 3:
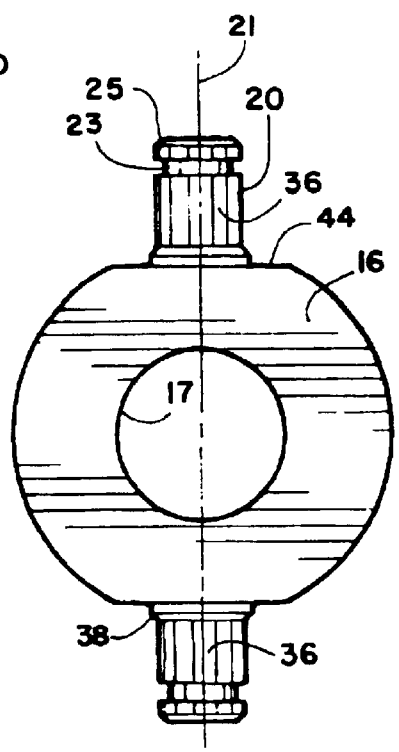
FIG. 3 is a top view of the unitary constructed body member showing the two shoulder portions projecting from the side of a central portion of the unitary body member.

The ring member 12 as depicted in FIG. 2 is best formed out of a single piece of material in a unitary structure and bent to the proper dimension where ring apertures 22 having a center point 27 located the two ends 34 cooperatively engage shoulders 20 formed as part of the body 14. The body 14 as shown in FIG. 3 is also a unitary structure formed from a single piece of material. A body aperture 17 communicates through a central portion of the body 14 thereby providing communication channel for screw 30 used in combination herewith or other cooperative attachment to the machinery to be lifted.

Two shoulders 20 are formed about the perimeter of the body 14 on a center axis 21 and in line with each other with both shoulders 20 being part of the entire body 14 formed in one piece. A bearing surface 36 is machined or otherwise formed about the exterior circumference of the shoulders 20 thereby dimensioning the shoulders 20 for cooperative rotational engagement with ring apertures 22 formed in the ring ends 34. This cooperative engagement of the shoulders 20 and the ring apertures 22 along the center axis 21 when the ring member 12 and body 14 are assembled into the device 10 provides a swivel means for the body 14 to rotate in the ring member 12 thus allowing the attached load being lifted to self-level.

At the base of the shoulders 20 where they meet with the central portion 16 in the current best embodiment, is a beveled edge 38 which rides on a cooperating beveled recess 31 formed where the lower edge 24 of the ring apertures 22 communicate with the inside edge 46 of the ring member 12 to provide an additional interior race for the assembled device 10 once the ring member 12 is bent to the U shape. Also, a flat exterior surface 44 of the central portion 16 on each side would provide a surface to mate with and rotate on the flat interior surface 46 of the ring member 12.

Both ends 34 of the ring member 12 have ring apertures 22 communicating therethrough such that the center of the ring apertures 22 are substantially in line with or immediately adjacent to the center axis 21 when the ring member 12 is bent or in its final "U" shape.

In order to facilitate the assembly of the device 10 the ring apertures 22 have a lower edge 24 that is parallel to the center axis 21 when the device 10 is fully assembled. The ring apertures 22 also have an upper edge 26 which tapers upward from the exterior edge 48 of the "U" shaped ring member 12 toward the interior thereof which would be adjacent to the body portion 14 when assembled. This taper 28 of the upper edge 26 is formed a sufficient distance around the upper half of the ring aperture 22 above the center point 27 to allow for the assembly of the device 10 to final form with the ring member 12 communicating over the shoulders 20 which communicate through the ring apertures 22. The distance of the taper 28 around the center point 27 in the current best mode varies from a maximum of substantially 180 degrees to a minimum of about 100 degrees but can vary depending on the amount of taper 28 needed to clear the distal ends of the shoulders 20 during assembly from the V shape to the U shape. During assembly, the ring member 12 would be initially bent to more of a "V" shape to allow the insertion of the shoulders 20 into the ring apertures 22 and with the taper 28 at this point is substantially parallel to the center axis 21 of the body 14 and formed in the ring apertures 22 approximately around the upper half of the ring aperture 22 which would be the circumference of the ring aperture 22 above the center axis 21 when the shoulders 20 are first inserted therein. The ring member 12 is then formed to its "u" shape to have two substantially parallel ends by bending it at which time the lower edge 24 is parallel to the center axis 21 and provides the race for the bearing surface 36 of the shoulders 20. The lower edge 24 of the ring apertures 22 being parallel to the center axis 21 thus provides operational contact between the lower edge 24 of the interior of the ring apertures and the bearing surface 36 of the shoulders 20 allowing the assembled ring member 12 to swivel on the body 14. Optionally, and in the current best mode, the taper 28 ceases a short distance before reaching the opposite end of the ring aperture 22 leaving a small portion of the upper edge 26 not tapered and parallel to the lower edge 24 of the ring aperture 22 thereby providing an upper race 29 which serves to ride on or immediately adjacent to the bearing surface 36 of the shoulders 20 to keep the shoulders 20 from moving or rattling inside their cooperative engagement in the ring apertures 22 when the ring member 12 is bent to the final U shape. Also, a slight taper 25 may be formed at the distal end of the shoulders 20 to facilitate the insertion into the ring apertures 22. Adjacent to the distal end of the shoulders 20 a notch 25 may also be placed for a clip to be installed should such be desired. As can be seen by those skilled in the art, tapering the ring apertures 22 would also allow for the easy manufacture of hoist rings that do not have a unitary construction of the body member 14 and such is anticipated however unitary construction would yield the best embodiment of the device due to substantially increased strength from eliminating the cooperative engagement of the shoulders 20.

As noted by making the body 14 out of a single piece of material in a unitary structure and mating it to a ring member 12 also formed of unitary structure, the need to assemble the device 10 on the job and lost parts is alleviated and the load-bearing ability of the assembled device 10 is significantly increased due to the elimination of the shear problems encountered with conventional hoist rings which use small parts and screws to assemble a multi piece body to a ring member.

FIG. 4 also depicts the steps in a preferred method of manufacturing and forming the device herein disclosed. First the ring member 12, formed from a single piece of material, and shaped like a "v" is fitted over the shoulders 20 protruding from the unitary body 14 of the device 10. The taper 28 in the upper edge 26 allows the ring aperture 22 to accommodate the shoulders 20 in both ring apertures 22. Once in position with both shoulders 20 inside both ring apertures 22, the ring member 12 is bent to a final U shape with both sides of the ring member substantially parallel and the bearing surface 36 engaged with the lower edge 24 of the ring apertures 22 and the upper race 29 riding upon or immediately adjacent to the bearing surface 36 of the shoulders 20.

While all of the fundamental characteristics and features of the present invention have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined by the following claims.

What is claimed is:

1. An improved hoist ring for use with a means of attachment of said hoist ring to a body to be hoisted comprising:
    a ring member, said ring member being of a unitary construction, said ring member being generally U shaped and having two substantially parallel legs terminating at two distal ends;
    a pair of apertures communicating through said ring member from an interior side of each of said parallel legs to an exterior side of each of said parallel legs, said apertures located adjacent to both distal ends of said ring member;
    each of said pair of apertures having an upper wall surface and a lower wall surface;
    a centerline extending through said pair of apertures;
    a body member, said body member being a unitary structure, said body member having a central portion and exterior portion and having a center axis therethrough;
    a pair of elongated shoulders protruding from said exterior portion, said shoulders being formed on said center axis and having an exterior surface; and
    said exterior surface of said pair of elongated shoulders in cooperative rotational engagement between an upper wall surface and a lower wall surface defining said pair of apertures in said ring members;
    said upper wall surface of each of said pair of apertures tapering toward said centerline from a first point adjacent to said interior side, to a second point adjacent to said exterior side; and
    said lower wall surface of each of said pair of apertures being substantially parallel to said center axis.

2. An improved hoist ring as defined in claim 1 wherein a section of said upper wall surface of each of said pair of apertures is substantially parallel to said lower wall surface of each of said pair of apertures, said section extending from said second point of each of said pair of apertures to a communication point of said upper wall surface with said exterior side of each of said parallel legs.

3. An improved hoist ring as defined in claim 2 wherein said section of said upper wall surface of each of said pair of apertures forms a race, said race parallel to said lower wall surface and rotationally engaged with said exterior surface of said parallel legs.

4. An improved hoist ring as defined in claim 3 wherein said upper surface of each of said pair of apertures extends a distance equal to or less than 180 degrees around said center point.

5. An improved hoist ring as defined in claim 3 additionally comprising:
    an interior race formed by a first beveled edge formed on said shoulders adjacent their communication with said exterior portion of said body member and a cooperating beveled recess formed in said lower edge of said ring apertures.

6. An improved hoist ring as defined in claim 2 wherein said upper surface of each of said pair of apertures extends a distance equal to or less than 180 degrees around said center point.

7. An improved hoist ring as defined in claim 2 additionally comprising:
    an interior race formed by a first beveled edge formed on said shoulders adjacent their communication with said exterior portion of said body member and a cooperating beveled recess formed in said lower edge of said ring apertures.

8. An improved hoist ring as defined in claim 1 wherein said upper surface of each of said pair of apertures extends a distance equal to or less than 180 degrees around said centerline.

9. An improved hoist ring as defined in claim 8 additionally comprising:
    an interior race formed by a first beveled edge formed on said shoulders adjacent their communication with said exterior portion of said body member and a cooperating beveled recess formed in said lower edge of said ring apertures.

10. An improved hoist ring as defined in claim 1 additionally comprising:
    an interior race formed by a first beveled edge formed on said shoulders adjacent their communication with said exterior portion of said body member and a cooperating beveled recess formed in said lower edge of said ring apertures.

11. An improved hoist ring as defined in claim 1 additionally comprising:

said exterior portion of said body member having substantially flat surfaced areas immediately adjacent to said elongated shoulders;

said interior side of each of said parallel legs having a substantially flat mating surface area; and the distance between said substantially flat mating surface areas on each of said parallel legs sized to allow rotation of said body member therebetween with said exterior portion of said body members substantially parallel to said substantially flat mating surface areas.

12. A method of manufacturing a hoist ring of having a body portion of unitary construction rotationally engaged with a hoist ring also of unitary construction comprising:

forming a body portion of unitary construction having two elongated shoulders with a substantially flat circumference about their exterior protruding in line from opposite sides of said body portion;

forming a hoist ring member in substantially a V shape and having two apertures defined by upper and lower surfaces formed around a centerline, one each of said two apertures adjacent to one of two distal ends of said hoist ring member;

tapering said upper surface of each of said two apertures from a first point where said two apertures communicate with an inside edge of said hoist ring member toward said centerline to a second point adjacent to an outside edge of said hoist ring member;

inserting said elongated shoulders of said body portion into said two apertures at said inside edge; and bending said hoist ring member to a U shape thereby positioning said lower surface substantially parallel to said substantially flat circumference of said elongated shoulders.

* * * * *